United States Patent
Lee et al.

(10) Patent No.: US 9,746,735 B2
(45) Date of Patent: Aug. 29, 2017

(54) FRINGE FIELD SWITCHING MODE LIQUID CRYSTAL DISPLAY DEVICE

(71) Applicant: LG Display Co., Ltd., Seoul (KR)

(72) Inventors: Byung Hyun Lee, Gyeonggi-do (KR); Chi Youl Lee, Gyeongsangbuk-do (KR); Gyu Sik Won, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/963,481

(22) Filed: Dec. 9, 2015

(65) Prior Publication Data

US 2016/0178981 A1    Jun. 23, 2016

(30) Foreign Application Priority Data

Dec. 17, 2014  (KR) .................. 10-2014-0182059

(51) Int. Cl.
*G02F 1/1362* (2006.01)
*G02F 1/1368* (2006.01)
*G02F 1/1343* (2006.01)

(52) U.S. Cl.
CPC ...... *G02F 1/136286* (2013.01); *G02F 1/1368* (2013.01); *G02F 1/134309* (2013.01); *G02F 1/136213* (2013.01); *G02F 2001/134345* (2013.01); *G02F 2001/134372* (2013.01); *G02F 2201/52* (2013.01)

(58) Field of Classification Search
CPC ......... G02F 1/136286; G02F 1/134309; G02F 1/1368; G02F 1/136213; G02F 2001/134345; G02F 2001/134372; H01L 27/1214

See application file for complete search history.

(56) References Cited

U.S. PATENT DOCUMENTS

| | | | | |
|---|---|---|---|---|
| 2005/0128401 A1* | 6/2005 | Lee | .................. | G02F 1/134363 349/139 |
| 2006/0262262 A1* | 11/2006 | Kim | .................. | G02F 1/134309 349/139 |
| 2009/0115946 A1* | 5/2009 | Yamada | ............ | G02F 1/134336 349/99 |
| 2010/0002162 A1* | 1/2010 | Morimoto | ......... | G02F 1/134363 349/38 |
| 2010/0197189 A1* | 8/2010 | Jin | .................... | G02F 1/133514 445/46 |
| 2012/0135661 A1* | 5/2012 | Imanishi | ........... | G02F 1/133723 445/24 |

OTHER PUBLICATIONS

Extended European Search Report dated Feb. 25, 2016, for corresponding European Patent Application No. 15196000.2.

* cited by examiner

*Primary Examiner* — Cuong B Nguyen
*Assistant Examiner* — Juanita Rhodes
(74) *Attorney, Agent, or Firm* — Morgan, Lewis & Bockius LLP

(57) ABSTRACT

An FFS mode LCD device is disclosed which includes: a substrate; gate and data lines arranged to cross each other on the substrate and define white, red, green and blue sub-pixels with asymmetric areas; first through fourth thin film transistors connected to the white, red, green and blue sub-pixels; common electrodes disposed in the white, red, green and blue sub-pixels; and white, red, green and blue pixel electrodes disposed to overlap with the common electrodes within the white, red, green and blue sub-pixels.

20 Claims, 4 Drawing Sheets

FRINGE FIELD SWITCHING MODE LIQUID CRYSTAL DISPLAY DEVICE

The present application claims priority under 35 U.S.C. §119(a) to Korean Patent Application No. 10-2014-0182059 filed on Dec. 17, 2014, which is hereby incorporated by reference in its entirety.

BACKGROUND

Field of the Disclosure

The present application relates to a liquid crystal display device, and more particularly, to a fringe field switching mode liquid crystal display device.

Description of the Related Art

In general, an LCD device displays images by controlling light transmittance of liquid crystal with dielectric anisotropy using an electric field. Such an LCD device includes a color filter array substrate and a thin film transistor array substrate combined with having a liquid crystal layer therebetween. The color filter array substrate is provided with a color filter array, and the thin film transistor array substrate is provided with a thin film transistor array.

In order to improve a narrow viewing angle of the LCD device, a variety of new modes applicable to the LCD device are being researched and developed. In accordance therewith, LCD devices being driven in one of an in-plane switching (IPS) mode, an optically compensated birefringence (OCB) mode, a fringe field switching (FFS) mode and so on, are being used as wide viewing angle LCD devices.

Among the wide viewing angle LCD devices, the IPS mode LCD device enables a lateral electric field to be generated between a pixel electrode and a common electrode which are arranged on the same substrate. As such, major axes of liquid crystal molecules are aligned along a lateral direction parallel to the substrate. In accordance therewith, the IPS mode LCD device can provide a wider viewing angle compared to a twisted nematic (TN) mode LCD device of the related art.

Such an LCD device includes an LCD panel, a gate driver, a data driver and so on. The LCD panel includes a plurality of pixels arranged in a matrix shape. The gate driver is used to drive gate lines on the LCD panel. The data driver is used to drive data lines on the LCD panel.

Also, the FFS mode LCD device has been derived from the IPS mode LCD device. The FFS mode LCD device allows a pixel electrode and a common electrode to be formed from a transparent conductive material. As such, the FFS mode LCD device can optimize transmittance of a pixel region.

Figure 1A:
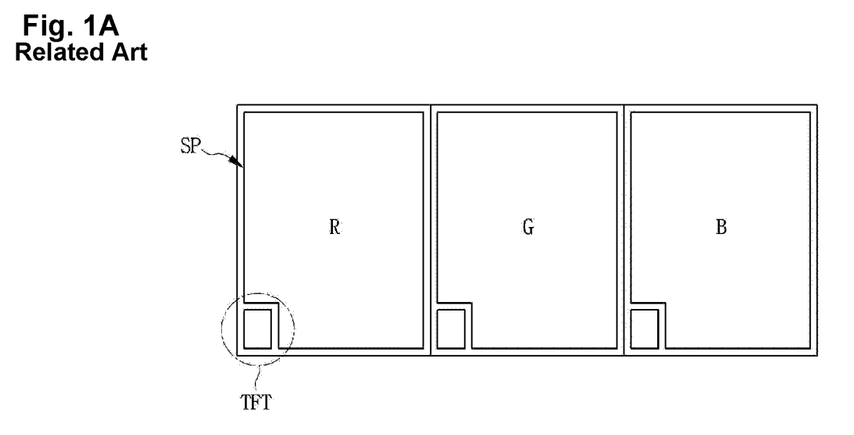
FIG. 1A is a planar view showing a pixel structure of an FFS mode LCD device according to the related art.
Figure 1B:
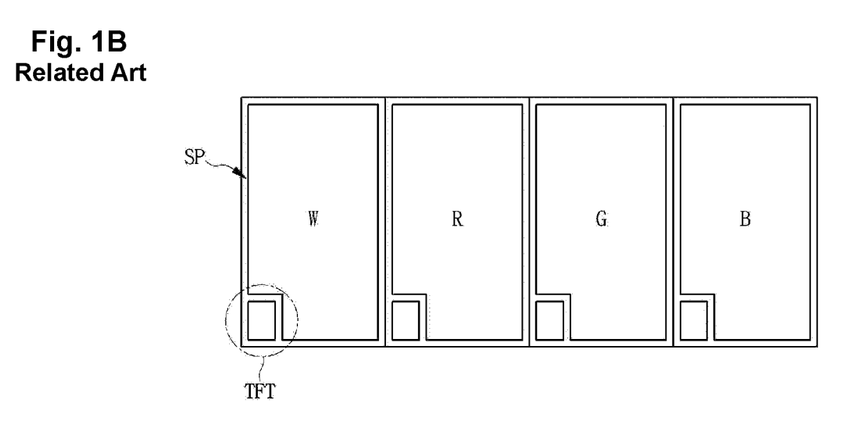
FIG. 1B is a planar view showing a pixel structure of the related art which further includes a white sub-pixel in order to secure transmittance.

FIG. 1A is a planar view showing a pixel structure of an FFS mode LCD device according to the related art. FIG. 1B is a planar view showing a pixel structure of the related art which further includes a white sub-pixel and secures transmittance.

Referring to FIG. 1A, an LCD panel of the FFS mode LCD device according to the related art allows a single pixel to be configured with a red (R) sub-pixel SP (hereinafter, "red sub-pixel RSP"), a green (G) sub-pixel SP (hereinafter, "green sub-pixel GSP") and a blue (B) sub-pixel SP (hereinafter, "blue sub-pixel BSP"). A thin film transistor TFT which used as a switching element is disposed in each of the sub-pixels SP.

Such an LCD panel adjusts light transmittances of the red, green and blue sub-pixels RSP, GSP and BSP, which are included in the single pixel P, by apply data signals to the red, green and blue sub-pixels RSP, GSP and BSP. In accordance therewith, the single pixel can display (or realize) a desired color.

Meanwhile, a recently required high definition LCD panel with the pixel structure of FIG. 1A cannot secure a sufficient transmittance. To this address this matter, it is proposed another pixel structure which further includes a white (W) sub-pixel SP (hereinafter, "white sub-pixel WSP") as shown in FIG. 1B.

Actually, an FFS mode LCD device allows a single pixel to be configured with white, red, green and blue sub-pixels WSP, RSP, GSP and BSP as shown in FIG. 1B. The light transmittances of the sub-pixels SP are adjusted on the basis of data signals applied to the sub-pixels SP. As such, the FFS mode LCD device can display a full color image.

In this case, the white sub-pixel WSP is used to secure transmittance rather than enhance color reproduction properties. As such, the single pixel can secure sufficient brightness.

However, the related art LCD panel with the pixel structure of FIG. 1B must reduce areas of the red, green and blue sub-pixels RSP, GSP and BSP because of further including the white sub-pixel WSP. Due to this, it is difficult to reproduce desired colors.

In other words, the pixel P further including the white sub-pixel WSP can secure a sufficient transmittance, but must deteriorate color reproduction properties due to the area-reduced of each sub-pixel SP.

SUMMARY

Accordingly, the present invention is directed to an FFS mode LCD device that substantially obviates one or more of problems due to the limitations and disadvantages of the related art.

An object of the present invention is to provide an FFS mode LCD device that is adapted to enhance a transmittance property of a pixel region by asymmetrically forming the area of a white sub-pixel WSP with respect to the areas of red, green and blue sub-pixels RSP, GSP and BSP.

Another object of the present invention is to provide an FFS mode LCD device that is adapted to prevent image quality defects due to different kickback voltages $\Delta V_p$ from one another by enabling white, red, green and blue sub-pixels WSP, RSP, GSP and BSP with asymmetric areas to have the same storage capacitance through a compensation of a storage capacitor.

Another object of the present invention is to provide a fringe field switching mode liquid crystal display device that is adapted to prevent deterioration of the image quality by compensating for a storage capacitance of a white sub-pixel region.

Additional features and advantages of the embodiments will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an FFS mode LCD device comprises: a substrate; gate and data lines arranged to cross each other on the substrate and define white, red, green and blue sub-pixels with asymmetric areas; first through fourth thin film transistors connected to the white, red, green and blue sub-pixels; common electrodes disposed in the white, red, green and blue sub-pixels; and white, red, green and blue pixel electrodes disposed to overlap with the common electrodes within the white, red, green and blue sub-pixels. As such, the white, red, green and blue sub-pixels with the asymmetric areas can have the same storage capacitance through a compensation of a storage capacitor. Therefore, the image quality defects caused by different kickback voltages ΔVp can be prevented.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE ILLUSTRATED EMBODIMENTS

Advantages and features of the present disclosure, and implementation methods thereof will be clarified through the following embodiments described with reference to the accompanying drawings. These embodiments introduced hereinafter are provided as examples in order to convey their spirits to the ordinary skilled person in the art. As such, these embodiments might be embodied in a different shape, so are not limited to these embodiments described here. Therefore, the present disclosure must be defined by scopes of claims.

In the following description, numerous specific details are set forth, such as particular structures, sizes, ratios, angles, coefficients and so on, in order to provide an understanding of the various embodiments of the present disclosure. However, it will be appreciated by one of ordinary skill in the art that the various embodiments of the present disclosure may be practiced without these specific details. The same reference numbers will be used throughout this disclosure to refer to the same or like parts. In other instances, well-known technologies have not been described in detail in order to avoid obscuring the present disclosure.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. As used herein, the singular forms "a", an and the are intended to include the plural forms as well, unless the context clearly indicates otherwise.

Elements used in the present disclosure without additional specific details must be considered to include tolerance.

In the description of embodiments, when a structure is described as being positioned "on or above" or "under or below" another structure, this description should be construed as including a case in which the structures contact each other as well as a case in which a third structure is disposed therebetween.

The temporal terms of "after", "subsequently", "next", "before" and so on used in this disclosure without specifying "immediately" or "directly" can include other discontinuously temporal relations.

Moreover, although some of the elements are designated with numerical terms (e.g., first, second, third, etc.), it should be understood that such designations are only used to specify one element from a group of similar elements, but not to limit the element in any specific order. As such, an element designated as a first element could be termed as a second element or as third element without departing from the scope of exemplary embodiments.

The features of various exemplary embodiments of the present disclosure may be partially or entirely bound or combined with each other, and be technically engaged and driven using various methods as apparent to those skilled in the art, and the exemplary embodiments may be independently practiced alone or in combination.

Reference will now be made in detail to the embodiments of the present disclosure, examples of which are illustrated in the accompanying drawings. Also, the size and thickness of the device might be expressed to be exaggerated for the sake of convenience in the drawings. Wherever possible, the same reference numbers will be used throughout this disclosure including the drawings to refer to the same or like parts.

Figure 2:
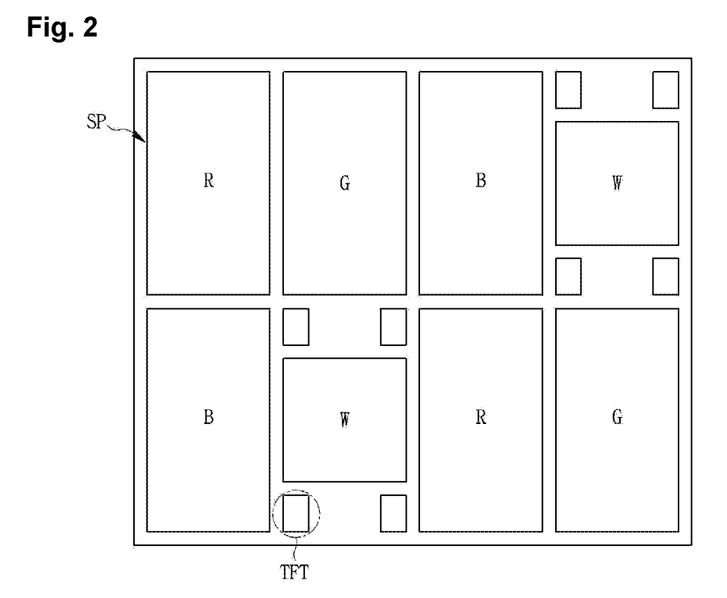
FIG. 2 is a planer view showing a pixel structure of an FFS mode LCD device according to an example embodiment of the present disclosure.

FIG. 2 is a planar view showing a pixel structure of an FFS mode LCD device according to an example embodiment of the present disclosure.

Referring to FIG. 2, An FFS mode LCD device is defined into a plurality of sub-pixel (SP) regions (hereinafter, "sub-pixel regions SP" by a plurality of gate lines (101 in FIG. 3) and a plurality of data lines (103 in FIG. 3). A single pixel P is configured with white, red, green and blue sub-pixels WSP, RSP, GSP and BSP.

The white, red, green and blue sub-pixels WSP, RSP, GSP and BSP are defined by being opposite to white (W), red (R), green (G) and blue (B) color filter layers (not shown) which are formed on an upper substrate (not shown). As such, any color filter layer may not be formed on the upper substrate opposite to the white sub-pixel WSP.

In order to realize high definition LCD device, the present disclosure allows not only the white sub-pixel WSP to be additionally included in the single pixel P but also the area of the white sub-pixel WSP to be asymmetric with respect to those of the red, green and blue sub-pixels RSP, GSP and BSP. Also, the area of the white sub-pixel WSP can be different from those of the red, green and blue sub-pixels RSP, GSP and BSP.

More specifically, in order to secure a sufficient transmittance rather than enhance color reproduction properties, the white sub-pixel WSP has a relatively small area. As such, the red, green and blue sub-pixels RSP, GSP and BSP can be defined in such a manner as to each have a maximized area.

In this manner, although the white sub-pixel WSP is included for securing a sufficient transmittance, the red, green and blue sub-pixels RSP, GSP and BSP of the LCD device of the present disclosure can be almost the same area as those of the pixel of the related art LCD device.

Also, the LCD device of the present disclosure allows thin film transistors TFT assigned to the white, red, green and blue sub-pixels WSP, RSP, GSP and BSP to be arranged between the green sub-pixel GSP and the white sub-pixel WSP opposite to each other. As such, the areas of the red, green and blue sub-pixels RSP, GSP and BSP can be more sufficiently secured.

In detail, the present disclosure distributively arranges the thin film transistors TFT, which are assigned to the white, red, green and blue sub-pixel regions WSP, RSP, GSP and BSP, in regions adjacent to top and bottom edge of the white sub-pixel WSP. As such, the thin film transistors TFT assigned to the white, red, green and blue sub-pixels WSP, RSP, GSP and BSP can be arranged alternatively with the green sub-pixel GSP and the white sub-pixels WSP along a vertical direction.

Although the white sub-pixel WSP is additionally included for securing a sufficient transmittance, the present disclosure can allow the areas of the red, green and blue sub-pixels to be sufficiently secured. In accordance therewith, deterioration of color reproduction properties which is caused in the related art LCD device due to enhancement of transmittance can be prevented.

In the LCD device of the present disclosure, the red sub-pixel RSP and the white sub-pixel WSP with a relatively small area are arranged adjacently to each other. Also, the blue sub-pixel BSP and the green sub-pixel GSP are arranged adjacently to each other in a horizontal direction.

Also, the red sub-pixel RSP and the blue sub-pixel BSP are adjacent to each other in a vertical direction. Also, the green sub-pixel GSP and the white sub-pixel WSP are adjacent to each other in the vertical direction.

Among the thin film transistors TFT assigned to the sub-pixels SP of the single pixel, two thin film transistors TFT are disposed adjacently to the bottom edge of the white sub-pixel WSP. The two thin film transistors TFT disposed adjacently to the bottom edge of the white sub-pixel WSP are connected to pixel electrodes which are disposed in the white sub-pixel WSP and the red sub-pixel RSP adjacent thereto.

On the other hand, the other two thin film transistors TFT are disposed adjacently to the top edge of the white sub-pixel WSP. Also, the two thin film transistors TFT disposed adjacently to the top edge of the white sub-pixel WSP are connected to pixel electrodes which are disposed in the green sub-pixel GSP and the blue sub-pixel BSP adjacent thereto.

In this manner, the FFS mode LCD device according to the embodiment of the present disclosure allows the area of the white sub-pixel WSP to be asymmetric with respect to those of the red, green and blue sub-pixels RSP, GSP and BSP. As such, the transmittance property of the pixel can be enhanced.

Moreover, the areas of the red, green and blue sub-pixels RSP, GSP and BSP can be sufficiently secured. Therefore, color reproduction properties of the FFS mode LCD device can be enhanced.

Figure 3:
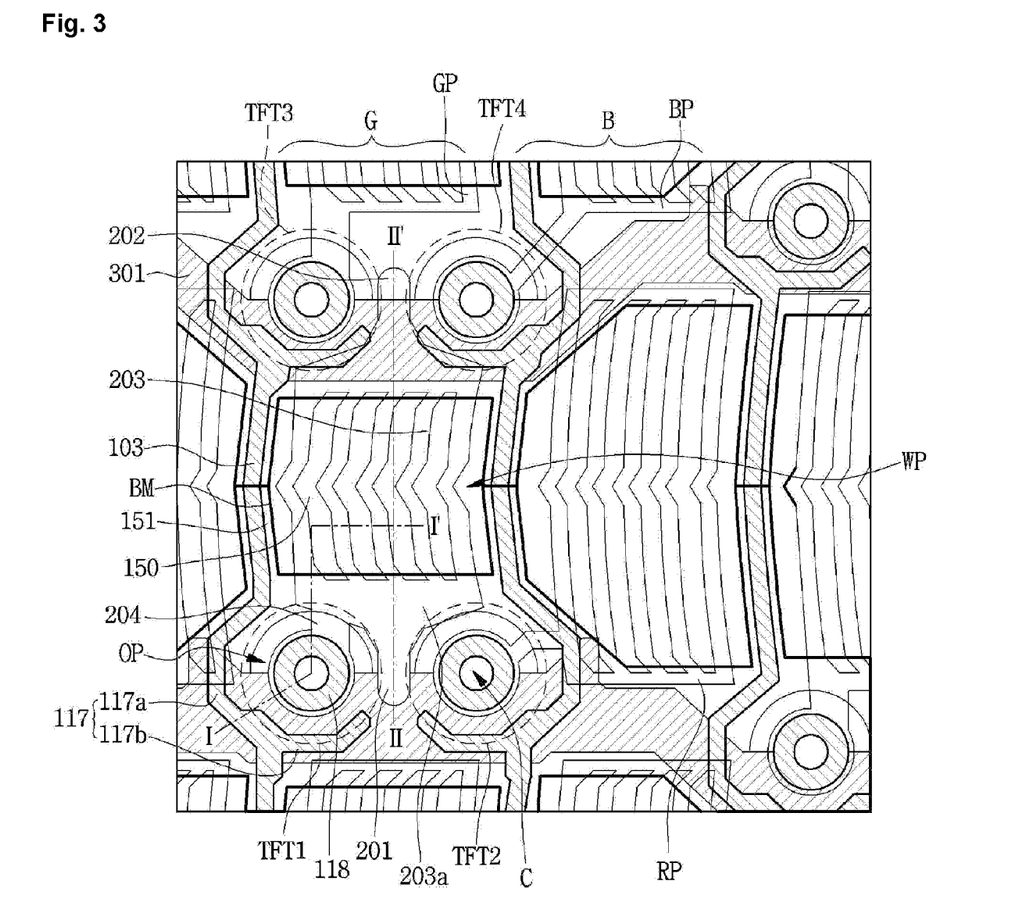
FIG. 3 is a planar view showing a white sub-pixel structure of an FFS mode LCD device according to an example embodiment of the present disclosure.
Figure 4:
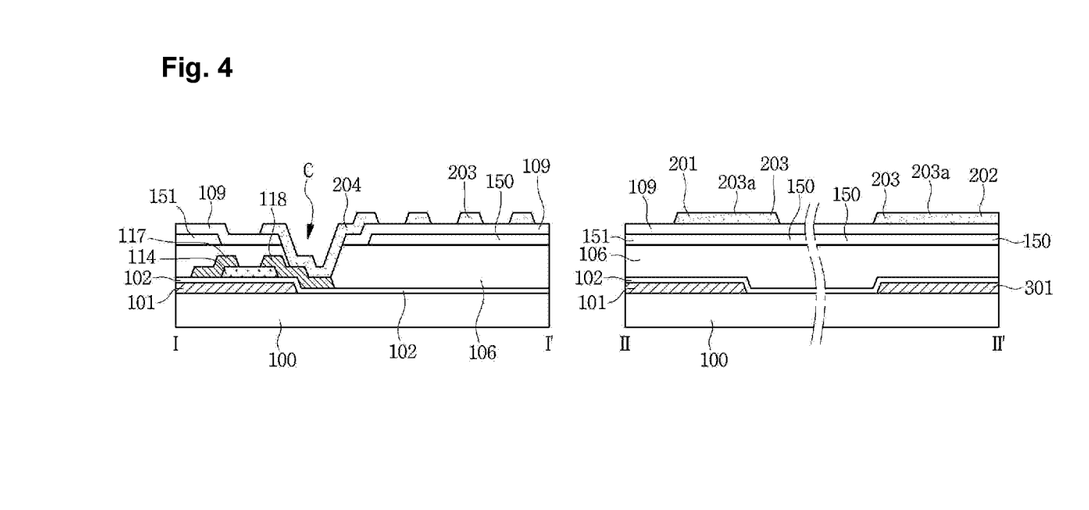
FIG. 4 is a cross-sectional view showing a white sub-pixel of an FFS mode LCD device taken along lines I-I' and II-II' in FIG. 3.

FIG. 3 is a planar view showing a white sub-pixel structure of an FFS mode LCD device according to an example embodiment of the present disclosure. FIG. 4 is a cross-sectional view showing a white sub-pixel of an FFS mode LCD device taken along lines I-I' and II-II' in FIG. 3.

Referring to FIGS. 3 and 4, the FFS mode LCD device according to an embodiment of the present disclosure includes gate lines 101 and data lines 103 crossing each other. As such, white, red, green and blue sub-pixel regions WSP, RSP, GSP and BSP are defined.

The green sub-pixel GSP and the blue sub-pixel BSP are adjacent to each other in a horizontal direction. The white sub-pixel WSP and the red sub-pixel RSP are adjacent to each other in the horizontal direction.

Also, the green sub-pixel GSP and the white sub-pixel WSP are adjacent to each other in a vertical direction. The blue sub-pixel BSP and the red sub-pixel RSP are adjacent to each other in the vertical direction.

The LCD device includes a first thin film transistor TFT1 and a second thin film transistor TFT2 which are arranged parallel to a gate line 101 in an adjacent region to a bottom edge of the white sub-pixel WSP. The first thin film transistor TFT1 is connected to a white pixel electrode WP of the white sub-pixel WSP. The second thin film transistor TFT2 is connected to a red pixel electrode RP adjacent to the white sub-pixel WSP.

Also, the LCD device further includes a third thin film transistor TFT3 and a fourth thin film transistor TFT4 are arranged parallel to another gate line 301, which is used to drive the green sub-pixel GSP, in an adjacent region to the top edge of the white sub-pixel WSP. The third thin film transistor TFT3 is connected to a green pixel electrode GP of the green sub-pixel GSP. The fourth thin film transistor TFT4 is connected to a blue pixel electrode BP adjacent to the green sub-pixel GSP.

The present disclosure allows the white sub-pixel WSP to be formed in a small area compared to the red, green and blue sub-pixels RSP, GSP and BSP. In accordance therewith, not only the transmittance of a single pixel (or a color pixel) can be sufficiently secured but also the areas of the red, green and blue sub-pixels can be sufficiently secured.

The first through fourth thin film transistors TFT1, TFT2, TFT3 and TFT4 are arranged between the white sub-pixel WSP and the green sub-pixel GSP and along a parallel direction with the gate line 103. In detail, the first through fourth thin film transistors TFT1, TFT2, TFT3 and TFT4 are disposed on one gate line 101, which is used to drive the white sub-pixel WSP, and another gate line 301 which is used to drive the green sub-pixel GSP adjacent to the white sub-pixel WSP. As such, the area occupied by the thin film transistors TFT1~TFT4 can be minimized.

For the convenience of explanation, the present disclosure will be explained with the first thin film transistor TFT1, which is assigned to the white sub-pixel WSP, as a center.

The first thin film transistor TFT1 is disposed on the gate line. As such, the first thin film transistor TFT1 uses the gate line 101 as its gate electrode.

Also, a drain electrode 118 of the first thin film transistor is disposed in overlapping with a part of the gate line 101. A source electrode 117 of the first thin film transistor TFT1 includes a first source electrode portion 117a and a second source electrode portion 117b. Such a source electrode 117 of the first thin film transistor TFT1 is formed in a semicircular ring shape surrounding the drain electrode 118.

The first source electrode portion 117a is disposed in a direction of the data line 103. The second source electrode portion 117b is disposed in a direction of the gate line 101.

As such, a channel layer region 114 between the source electrode 117 and the drain electrode 118 can be sufficiently secured. In accordance therewith, response characteristics of the first thin film transistor TFT1 can be enhanced.

Meanwhile, the second through fourth thin film transistors TFT2, TFT3 and TFT4 are formed in the same structure as the first thin film transistor TFT1.

The white pixel electrode WP electrically connected to the first thin film transistor TFT1 is disposed in the white sub-pixel region WSP. A common electrode 150 is disposed under the white pixel electrode WP.

The common electrode 150 disposed under the white pixel electrode 150 is formed on the entire surface of a substrate 100. However, openings OP are formed in regions of the common electrode 150 opposite to the first through fourth thin film transistors TFT1 through TFT4. The openings OP can enable parasitic capacitances generated between the thin film transistors TFT1 through TFT4 and the common electrode 150 to be reduced.

Such a common electrode 150 can have a plate shape. As such, the common electrode 150 is formed in the sub-pixel regions SP and non-display regions between the sub-pixel regions SP. A part of the common electrode 150 overlapping with the data line 103 can be used as a common wiring 151.

In other words, the common electrode 150 and the common wiring 151 are united with each other in a single plate shape. As such, the common electrode 150 and the common wiring 150 can be formed in the single plate shape opposite to all the white, red, green and blue sub-pixel regions WSP, RSP, GSP and BSP.

Such a white pixel electrode WP includes horizontal bars 203a parallel to the gate lines 101 and 301 and a plurality of vertical bars 203 perpendicular to the horizontal bar 203a. Also, the white pixel electrode WP further includes first and second extensive portions 201 and 202 and a connection portion 204. The first and second extensive portions 201 and 202 each extend from the respective horizontal bar 203a toward the adjacent gate line 101 or 301 thereto. The connection portion 204 is connected to the drain electrode 118 via a contact hole C.

The horizontal bars 203a are disposed parallel to one gate line 101 and another gate line 301, which is disposed in the region of the adjacent green sub-pixel GSP, with having the vertical bars 203. In other words, the horizontal bars 203a are disposed in a bottom edge region of the white sub-pixel WSP adjacent to one gate line 101 and a top edge region of the white sub-pixel region WSP adjacent to another gate line 301.

The first extensive portion 201 is formed in a single body united with the respective horizontal bar 203a. Also, the first extensive portion 201 is disposed to cross the gate line 101. Similarly, the second extensive portion 202 is formed in a single body 203 united with the respective horizontal bar 203a. Also, the second extensive portion 203 is disposed to cross the gate line 301 within the region of the adjacent green sub-pixel GSP.

In other words, the first and second extensive portions 201 and 202 extend from outer edges of the horizontal bars 203a toward downward and upward directions of the white sub-pixel WSP parallel to the data line 103.

Such first and second extensive portions 201 and 202 partially overlap with the common electrode 150 corresponding to the regions of the gate lines 101 and 301. As such, the storage capacitance of the white sub-pixel WSP can be additional secured.

This results from the fact that the present disclosure must enable storage capacitance in the region of the white sub-pixel WSP to be smaller than those of the other sub-pixel regions due to the area of the white sub-pixel WSP being smaller than those of the other sub-pixels.

In general, a kickback voltage ΔVp in each of the sub-pixels SP is determined by the following equation 1.

$$\Delta Vp = \frac{Cgs}{(Cgs + Cst + Clc)} \Delta Vg \quad \text{[Equation 1]}$$

In the equation 1, 'Clc' is a capacitance of a liquid crystal cell, 'Cst' is a storage capacitance, 'Cgs' is a parasitic capacitance, and 'ΔVg' is a gate voltage difference.

The kickback voltage ΔVp is varied with the storage capacitance Cst of the sub-pixel SP. As such, a data voltage applied to the sub-pixel SP must be varied with the kickback voltage ΔVp. Due to this, image quality of the LCD device must deteriorate.

Actually, the present disclosure allows the white sub-pixel WSP to be formed in a smaller area compared to those of the other sub-pixels SP. As such, the kickback voltages ΔVp generated in the white, red, green and blue sub-pixels WSP, RSP, GSP and BSP cannot have the same value.

In other words, because the white sub-pixel WSP is formed in a smaller area than those of the red, green and blue sub-pixels RSP, GSP and BSP, the kickback voltage ΔVp generated in the white sub-pixel WSP is developed larger than the kickback voltages ΔVp generated in the red, green and blue sub-pixels RSP, GSP and BSP. As such, deviation of the data voltages applied to the sub-pixels SP can become larger. Due to this, image quality defects can be generated.

In this manner, the LCD device of the present disclosure not only enhances transmittance and color reproduction properties but also the sub-pixel region with an asymmetrically formed area to secure an additional storage capacitance. As such, the kickback voltages ΔVp generated in the white, red, green and blue sub-pixels WSP, RSP, GSP and BSP can have the same value. In other words, the kickback voltages ΔVp generated in the sub-pixels SP can have the same value or similar values for one another. In accordance therewith, the image quality defects can be prevented or reduced.

A method of fabricating an FFS mode LCD device according to an embodiment of the present disclosure will now be described.

First, gate lines are formed on a substrate 100 which is defined into white, red, green and blue sub-pixel regions WSP, RSP, GSP and BSP and formed from a transparent insulation material. The gate line is prepared by forming a gate metal film on the substrate 100 and patterning the gate metal film through a photolithography procedure.

In the LCD device of the present disclosure, gate electrodes of first through fourth thin film transistor TFT1~TFT4 are formed on the gate line 101. As such, it is not necessary for any separate gate electrode pattern. In other words, the gate line 101 can be used as the gate electrode of the thin film transistor.

The gate metal film can be formed in one of a single metal film of an opaque low-resistive conductor material and a double film structure. The double film structure can includes a first metal film formed from an opaque low-resistive conductor material film and a second metal film formed from an alloy of the opaque low-resistive conductor material. The opaque low-resistive conductor material can be one of aluminum Al, an aluminum alloy, tungsten W, copper Cu, nickel Ni, chromium Cr, molybdenum Mo, titanium Ti, platinum Pt, tantalum or other metals. Alternatively, the gate metal film can be formed in a multi-layered structure including at least two stacked metal films.

When the gate line 101 is formed on the substrate 100, a gate insulation film 102 is formed on the entire surface of the substrate 100. The gate insulation film 102 can be formed in a single layer of silicon oxide SiOx. Alternatively, the gate insulation film 102 can be formed by alternately depositing a silicon nitride SiNx and a silicon oxide SiOx.

Then, a channel 104 is formed on the gate insulation film 102 opposite to a part of the gate line 101. The channel 104 can be prepared by forming a semiconductor layer on the gate insulation film 102 and patterning the semiconductor layer using a mask procedure.

The semiconductor layer can include one of crystalline and amorphous silicon films and an ohmic contact layer. Alternatively, the semiconductor layer can be an oxide semiconductor layer.

The oxide semiconductor layer can be formed from an amorphous oxide which includes at least one of Indium In, zinc Zn, gallium Ga and hafnium Hf. For example, if the oxide semiconductor layer is formed from the oxide semiconductor of Ga—In—Zn—O through a sputtering process, three targets formed of $In_2O_3$, $Ga_2O_3$ and ZnO or a single target formed from Ga—In—Zn oxide can be used in the sputtering process. Alternatively, the oxide semiconductor layer can be formed through the sputtering process which uses either three targets formed from $HfO_2$, $In_2O_3$ and ZnO or a single target formed from Hf—In—Zn oxide.

When the channel layer 104 is formed on the substrate 100 as described above, source and drain electrodes 117 and 118 partially contacting the channel 104 and a data line 103 are formed. The source and drain electrode 117 and 118 and the data line 103 can be prepared by forming a source/drain metal film on the entire surface of the above-mentioned substrate 100 and then performing a photolithography procedure for the source/drain metal film.

The source/drain metal film can be formed from an opaque low-resistive conductor material. For example, the source/drain metal film can be formed from one of aluminum Al, an aluminum alloy, tungsten W, copper Cu, nickel Ni, chromium Cr, molybdenum Mo, titanium Ti, platinum Pt, tantalum Ta and so on. Alternatively, the source/drain metal film can be formed in a double layered structure which includes stacked transparent conductive material layer and opaque conductive material layer. The transparent conductive material layer can be formed from one of indium-tin-oxide ITO and indium-zinc-oxide IZO.

Thereafter, a planarization film 106 is formed on the entire surface of the above-mentioned substrate 100. Also, a transparent conductive film is formed on the planarization film 106. The transparent conductive film can be formed from one of indium-tin-oxide ITO, indium-zinc-oxide IZO and indium-tin-zinc-oxide ITZO.

After the transparent conductive film is formed on the substrate 100, a photolithography procedure is performed for the transparent conductive film. Then, a common electrode 150 and a common wiring 151 are formed in a single body united with each other. As described above, the common electrode 150 is formed on the entire surface of the substrate 100 in a plate shape. In this case, a part of the common electrode 150 opposite to the data line 103 can be used as the common wiring 151. As such, the common electrode 150 and the common wiring 151 united with each other can have the plate shape.

When the common electrode 150 is formed on the substrate 100 as described above, a protective film 109 is formed on the entire surface of the substrate 100. Subsequently, a contact hole C exposing a part of the drain electrode 118 is formed through a contact hole formation process.

After the formation of the contact hole C, another transparent conductive film is formed on the entire surface of the above-mentioned substrate 100. Then, a photolithography procedure is performed for another transparent conductive film, thereby forming a white pixel electrode WP, a red pixel electrode RP, a green pixel electrode GP and a blue pixel electrode BP in the sub-pixel regions SP.

As described above, the white pixel electrode WP includes horizontal bars 203a, vertical bars 203, first and second extensive portions 201 and 202 and a connection portion 204. The connection portion 204 is connected to the drain electrode 118 through the contact hole C.

As shown in the cross-sectional structure of FIG. 4 taken along a line I-I', the vertical bars 203 arranged in the white sub-pixel region WSP overlap with the common electrode 150 with having the protective film 109 therebetween.

Also, the first extensive portion 201 of the white pixel electrode WP overlaps with a gate line 101 which is used to drive the white sub-pixel WSP, as show in the cross-sectional structure of FIG. 4 taken along another line II-II'. As such, the first extensive portion 201 together with the common electrode 150 disposed thereunder can form an additional storage capacitor Cst.

Similarly, the second extensive portion 202 of the white pixel electrode WP is disposed in an overlapping manner with another gate line 301 which is used to drive the adjacent green sub-pixel region GSP. As such, the second extensive portion 202 together with the common electrode 150 disposed thereunder can form another additional storage capacitor Cst.

In other words, the present disclosure allows the first and second extensive portions 201 and 202, vertical bars 203 and horizontal bars 203a of the white pixel electrode WP together with the common electrode 150 disposed thereunder to form a storage capacitor Cst. As such, the white sub-pixel region WSP can have the same storage capacitance as those of the red, green and blue sub-pixel regions RSP, GSP and BSP. In accordance therewith, the image quality defects can be prevented.

In this manner, the FFS mode LCD device according to the embodiment of the present disclosure the area of the white sub-pixel WSP to be asymmetrically formed with respect to those of the red, green and blue sub-pixels RSP, GSP and BSP. As such, the transmittance property of the pixel region can be enhanced.

In the FFS mode LCD device according to the embodiment of the present disclosure, the white, red, green and blue sub-pixels WSP, RSP, GSP and BSP with the asymmetric areas can have the same storage capacitance through a compensation of a storage capacitor. Therefore, the image quality defects caused by different kickback voltages ΔVp can be prevented.

It will be apparent to those skilled in the art that various modifications and variations can be made in the FFS mode LCD device of the present invention without departing from the spirit or scope of the invention. Thus, it is intended that the present invention cover the modifications and variations of this invention provided they come within the scope of the appended claims and their equivalents.

What is claimed is:
1. A fringe field switching mode liquid crystal display device, comprising:
a substrate;
gate and data lines arranged to cross each other on the substrate and define white, red, green, and blue sub-pixel areas, the white sub-pixel areas being asymmetrically formed with respect to each of the red, green, and blue sub-pixel areas;

first through fourth thin film transistors connected to respective white, red, green, and blue sub-pixel areas with the first through fourth thin film transistors in regions adjacent to top and bottom edges of one of the white sub-pixel areas;

common electrodes disposed in the respective areas of the white, red, green, and blue sub-pixel areas; and white, red, green, and blue pixel electrodes disposed to overlap with the common electrodes within the respective areas of the white, red, green, and blue sub-pixel areas.

2. The fringe field switching mode liquid crystal display device of claim 1, wherein the respective areas of the red, green, and blue sub-pixel areas are larger than that of the white sub-pixel areas.

3. The fringe field switching mode liquid crystal display device of claim 2, wherein the white and green sub-pixel areas are disposed alternately with each other in a vertical direction.

4. The fringe field switching mode liquid crystal display device of claim 3, wherein the first through fourth thin film transistors are arranged between one white sub-pixel areas and directly adjacent ones of the green sub-pixel areas.

5. The fringe field switching mode liquid crystal display device of claim 1, wherein the white pixel electrode includes:

horizontal bars disposed parallel to the gate lines;

vertical bars arranged disposed between the horizontal bars in parallel with the data line; and first and second extensive portions configured to extend from the horizontal bars along upward and downward directions of the white sub-pixel area parallel to the data line.

6. The fringe field switching mode liquid crystal display device of claim 5, wherein the white sub-pixel area includes a storage capacitor formed between the white pixel electrode, which includes the horizontal bars, the vertical bars and the first and second extensive portions, and the common electrode disposed under the white pixel electrode.

7. The fringe field switching mode liquid crystal display device of claim 5, wherein the first extensive portion overlaps with the gate line used to drive the white sub-pixel area, and the second extensive portion overlaps with the gate line used to drive the green sub-pixel area.

8. The fringe field switching mode liquid crystal display device of claim 1, wherein the first and second thin film transistors are disposed in the region adjacent to the bottom edge of the one of the white sub-pixel areas, and the third and fourth thin film transistors are disposed in the region adjacent to the top edge of the white sub-pixel area.

9. The fringe field switching mode liquid crystal display device of claim 8, wherein the first and second thin film transistors are disposed in an overlapping manner with the gate line which is used to drive the white sub-pixel area, and the third and fourth thin film transistors are disposed in an overlapping manner with the gate line which is used to drive the green sub-pixel area.

10. The fringe field switching mode liquid crystal display device of claim 8, wherein the first thin film transistor is connected to the white pixel electrode, the second thin film transistor is connected to the red pixel electrode, the third thin film transistor is connected to the green pixel electrode, and the fourth thin film transistor is connected to the blue pixel electrode.

11. The fringe field switching mode liquid crystal display device of claim 10, wherein the gate lines are used as gate electrodes of the first through fourth thin film transistors.

12. The fringe field switching mode liquid crystal display device of claim 1, wherein each of the first through fourth thin film transistors includes a source electrode formed in a semicircular ring shape.

13. The fringe field switching mode liquid crystal display device of claim 12, wherein each of the source electrodes of the first through fourth thin film transistors includes a first source electrode portion parallel to the gate line and a second source electrode portion parallel to the data line and is disposed to surround a drain electrode of the respective one of the first through fourth thin film transistors.

14. The fringe field switching mode liquid crystal display device of claim 1, wherein a collective of the common electrodes with the respective areas of the white, red, green, and blue sub-pixel areas is formed in a single body shape.

15. The fringe field switching mode liquid crystal display device of claim 14, wherein the collective of the common electrodes formed in the single body shape has a plate shape.

16. The fringe field switching mode liquid crystal display device of claim 15, wherein the collective of the common electrodes formed in the single body shape has an opening opposite to each of the first through fourth thin film transistors.

17. The fringe field switching mode liquid crystal display device of claim 1, wherein the first through fourth thin film transistors are each adjacent to a respective corner of the white sub-pixel area.

18. The fringe field switching mode liquid crystal display device of claim 5, wherein the first through fourth thin film transistors are each adjacent to a respective corner of the white sub-pixel area.

19. The fringe field switching mode liquid crystal display device of claim 1, wherein the common electrodes as well as the white, red, green, and blue pixel electrodes are formed of a transparent conductive material.

20. The fringe field switching mode liquid crystal display device of claim 1, wherein the white, red, green, and blue pixel electrodes are each rectangular shaped.

* * * * *